United States Patent [19]
Nigo

[11] Patent Number: 5,186,016
[45] Date of Patent: Feb. 16, 1993

[54] DEFROSTING CONTROL METHOD AND APPARATUS FOR AIR CONDITIONER

[75] Inventor: Toshiro Nigo, Fuji, Japan

[73] Assignee: Kabushiki Kaisha Toshiba, Kawasaki, Japan

[21] Appl. No.: 782,485

[22] Filed: Oct. 25, 1991

[30] Foreign Application Priority Data

Nov. 6, 1990 [JP] Japan ................................. 2-300559

[51] Int. Cl.⁵ .............................................. F25D 21/00
[52] U.S. Cl. ......................................... 62/150; 62/155; 62/228.4
[58] Field of Search ..................... 62/228.4, 228.5, 150, 62/151, 154, 155, 156, 140

[56] References Cited

U.S. PATENT DOCUMENTS 5,065,593  5/1992  Dudley et al. ..................... 62/228.4

FOREIGN PATENT DOCUMENTS 0087549  6/1982  Japan ...................................... 62/150
59-3311   1/1984  Japan .
0231132   9/1988  Japan ................................... 62/228.4

Primary Examiner—Harry B. Tanner
Attorney, Agent, or Firm—Foley & Lardner

[57] ABSTRACT

A defrosting control method for an air conditioner wherein when the frost amount of an outdoor heat exchanger becomes an allowable value or more during a heating operation, a defrosting operation is performed for defrosting the outdoor heat exchanger. A time period is calculated which is required for a room temperature to reach a preset temperature after the start of the heating operation by an inverter running at one of a predetermined plurality step of frequencies, in accordance with an environmental condition data. A frost amount of the outdoor heat exchanger is calculated in accordance with the environmental condition data, under the condition that the inverter runs for the calculated time period. There is selected an inverter output frequency from the plurality step of frequencies, the inverter output frequency allowing each of the calculated amounts to take the allowable value or less, the allowable value being determined as a level indicating the defrosting operation is unnecessary. The inverter or air conditioner is operated at the selected output frequency.

10 Claims, 8 Drawing Sheets

DEFROSTING CONTROL METHOD AND APPARATUS FOR AIR CONDITIONER

FIELD OF THE INVENTION

The present invention relates to defrosting control for air conditioners of the type where variable speed operation of a compressor is carried out by an inverter.

PRIOR ART

During heating operation of an air conditioner, the outdoor heat exchanger is exposed to low temperature external atmospheric air, and low temperature refrigerant flows within it. Therefore, when a certain period of time lapses after heating operation, some frost is deposited on the outdoor heat exchanger. The deposited frost lowers the heat exchange efficiency and heating capacity. It is therefore necessary to defrost the outdoor heat exchanger.

In a conventional air conditioner, a method has been used whereby frost is removed by temporarily carrying out a cooling operation to flow high temperature refrigerant within the outdoor heat exchanger.

As described above, defrosting operation for the outdoor heat exchanger is inevitable for efficient heating operation. However, during defrosting operation, heating operation is temporarily stopped and cooling operation is temporarily carried out. During such a time period, the heating performance is degraded and the room temperature is lowered.

In a conventional air conditioner, if the amount of frost on the outdoor heat exchanger exceeds an allowable value, the defrosting operation automatically starts irrespective of the room temperature at that time. The room temperature may lower to the degree that a person in the room feels uncomfortable.

When heating operation starts in a room, particularly in a very cool room, it is required to raise the room temperature as fast as possible. Even in such a case, a conventional air conditioner may often enter defrosting operation, making a person in the room more uncomfortable.

SUMMARY OF THE INVENTION

It is therefore an object of the present invention to provide an air conditioner of an inverter controlled type, capable of reducing this uncomfortable feeling and suppressing lowering of the heating capacity caused by a defrosting operation, as much as possible.

In order to achieve the above object, the present invention provides a defrosting control method for an air conditioner having a refrigerating cycle including in succession a compressor, an indoor heat exchanger, a decompressor, and an outdoor heat exchanger, the compressor being variable-speed driven by an inverter via a compressor motor, and when the frost amount of the outdoor heat exchanger becomes an allowable value or more during a heating operation, a defrosting operation is performed for defrosting the outdoor heat exchanger, the defrosting control method comprising: a first step of setting a plurality step of frequencies which the inverter can output; a second step of calculating a time period required for a room temperature to reach a preset temperature after the start of the heating operation by the inverter running at one of the plurality step of frequencies, in accordance with environmental condition data such as a heating load at the previous time operation; a third step of calculating the frost amount of the outdoor heat exchanger in accordance with the environmental condition data, under the condition that the inverter runs for the time period calculated at the second step; a fourth step of selecting an inverter output frequency from the plurality step of frequencies set at the first step, the inverter output frequency allowing each of the frost amounts calculated at the third step to take the allowable value or less, the allowable value being determined as a level indicating that defrosting operation is unnecessary; and a fifth step of controlling the inverter so as to have the output frequency selected at the fourth step.

According to the present invention, in heating operation, a defrosting operation is generally not carried out until the room temperature reaches a preset temperature. Therefore, the heating capability is not temporarily lowered greatly by defrosting operation, providing a comfortable feeling at the start of heating operation.

The fourth step includes a step of selecting one of the inverter output frequencies allowing each frost amount to take the allowable value or less, the selected inverter output frequency making the time period the shortest. In this case, the inverter is controlled so that the time period while the room temperature reaches the preset temperature is made shortest. As a result, uncomfortable feeling which might otherwise caused by the defrosting operation immediately after the start of the heating operation are avoided, providing a more comfortable feeling during heating operation.

There are cases when defrosting inevitably operation becomes necessary before the room temperature reaches the preset temperature, such as in cold districts. It is preferable to control the inverter in the following manner. There are further provided a sixth step of calculating a time period allowing each frost amount to take an allowable value, if there is no frost amount calculated at the third step which amount takes the allowable value or less; a seventh step of calculating each room temperature to be obtained when the inverter runs for the time period calculated at the sixth step, in accordance with the environmental condition data; and an eighth step of selecting one of the inverter output frequencies corresponding to one of the room temperatures calculated at the seventh step, the room temperature being nearest to the preset temperature, wherein in the case where it is necessary to perform defrosting operation before the room temperature reaches the preset temperature at any one of the frequencies set at the first step, the inverter is controlled to run and have the output frequency selected by the eighth step until the defrosting operation is carried out.

With such an arrangement, even if defrosting operation is required to be performed before the room temperature reaches the preset temperature, the room temperature can be made nearest the preset temperature when the defrosting operation starts. Accordingly, uncomfortable feeling which might be caused otherwise by the temporary lowering of the heating capability due to a defrosting operation can be minimized. For example, in cold districts, uncomfortable feelings can be which might be caused otherwise by a defrosting operation immediately after the start of a heating operation, can be suppressed as much as possible.

DETAILED DESCRIPTION OF THE PREFERRED EMBODIMENTS

Preferred embodiments of the present invention will be described with reference to FIGS. 1 to 10.

Figure 1:
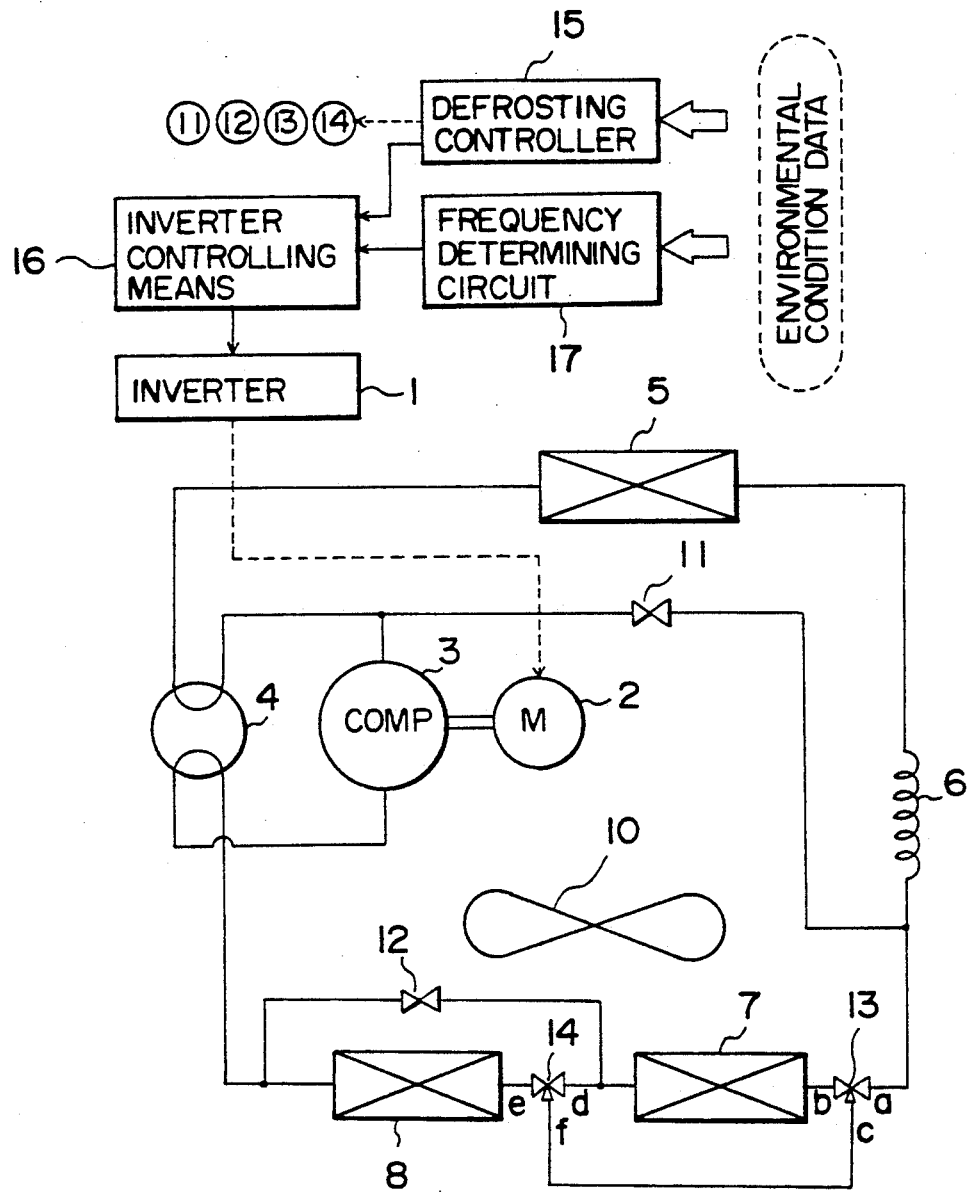
FIG. 1 is a block diagram showing an outline view of a defrosting control apparatus of an air conditioner according to the present invention.

FIG. 1 is a schematic diagram showing a refrigerating cycle of an air conditioner and a controller for controlling the air conditioner according to the present invention. An inverter 1 variable-speed drives a motor 2 which in turn drives a compressor 3.

In a heating operation, refrigerant delivered out of the compressor 3 is sent via a four-port valve 4 to an indoor heat exchanger 5. The refrigerant subject to heat exchange at the indoor heat exchanger 5 is sent via a capillary 6 to first and secondary outdoor heat exchangers 7 and 8 whereat it is subjected to heat exchange and thereafter returned via the four-port valve 4 to the suction port of the compressor 3.

Figure 2:
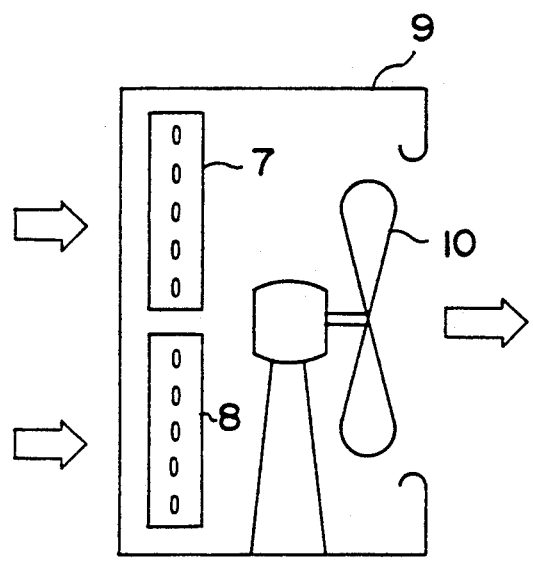
FIG. 2 is a schematic diagram of the outdoor heat exchanger shown in FIG. 1.

The outdoor heat exchangers 7 and 8 are disposed at the higher and lower positions within an outdoor unit box 9, as shown in FIG. 2. An outdoor fan 10 is disposed in front of the outdoor heat exchangers 7 and 8 so that heat exchange is performed with atmospheric air (flowing in the direction indicated by an arrow) introduced within the outdoor unit box 9 while the outdoor fan 10 rotates.

In the refrigerant circulating circuit (refrigerating cycle) shown is FIG. 1, there are provided two-port valves 11 and 12 and three-port valves 13 and 14 which are controlled by a defrosting controller 15. The operation of the defrosting controller 15 will be described later.

The inverter 1 is variable-frequency controlled by an inverter controlling means 16 whose control frequency is determined by a frequency determining circuit 17 comprising a microcomputer.

Figure 3:
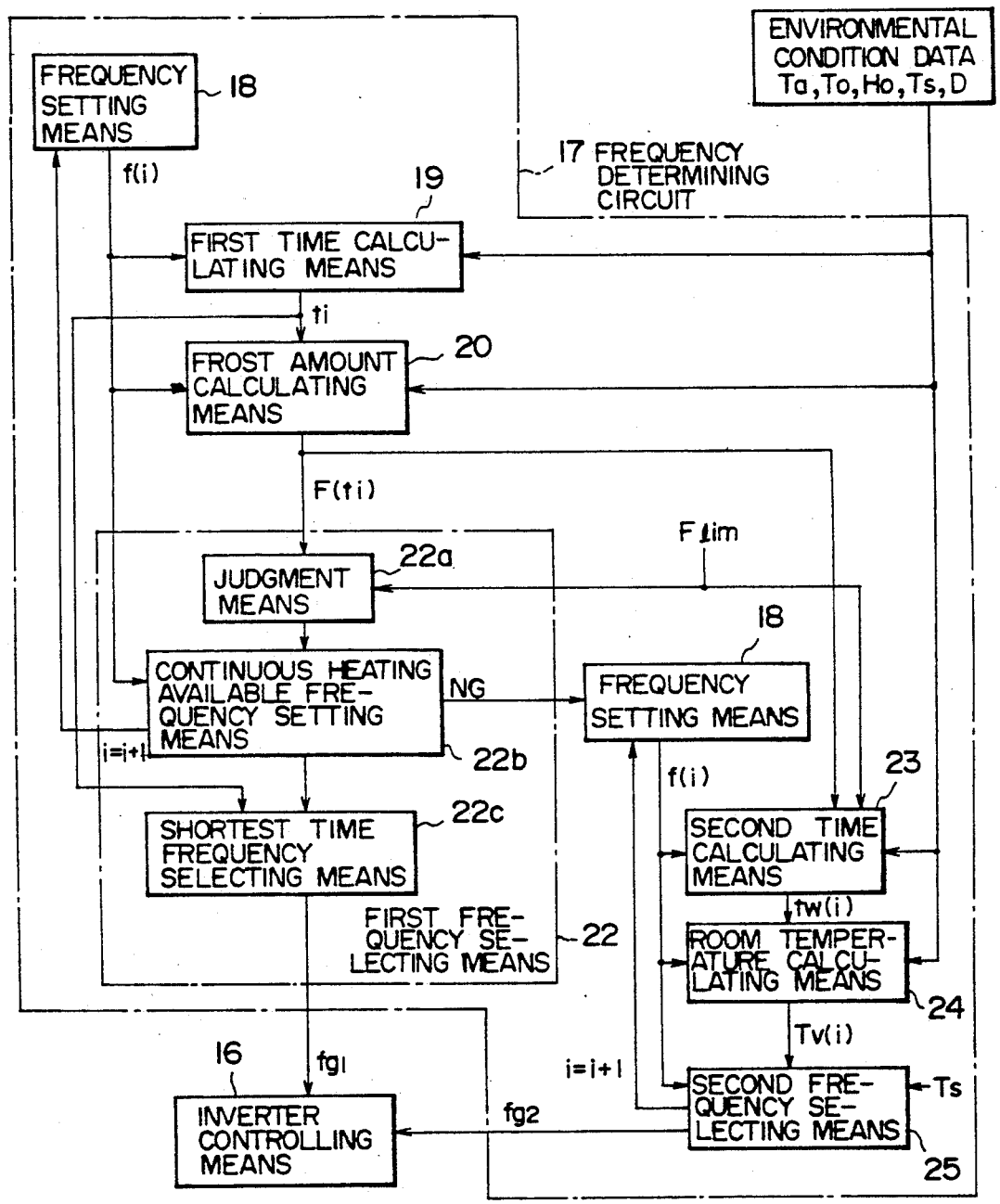
FIG. 3 is a block diagram showing the defrosting control apparatus of an air conditioner according to an embodiment of the present invention.

FIG. 3 is a block diagram showing the details of the frequency determining circuit 17. The frequency determining circuit 17 is constructed of a frequency setting means 18, a first time calculating means 19, a frost amount calculating means 20, a first frequency selecting means 22, a second time calculating means 23, a room temperature calculating means 24, and second frequency selecting means 25.

The frequency setting means 18 (upper left in FIG. 3) sets n +1 steps of output frequencies f(i) (i=0 to n) of the inverter 1, and sequentially outputs signals representative of the frequencies f(i).

The first time calculating means 19 calculates a time period ti required for the inverter 1 running at the frequency f(i) to change the room temperature Ta to a preset temperature Ts, in accordance with outdoor and indoor environmental condition data. The "environmental condition data" herein used means a room temperature Ta, atmospheric temperature To, and atmospheric humidity Ho detected with sensors (not shown), a preset data set by an operation unit (not shown), and a heating operation load data (D) at the previous time (day) stored in a memory (not shown). The environmental condition data includes the data associated with an indoor environment such as the room temperature Ta and preset temperature Ts, the data associated with an outdoor environment such as the atmospheric temperature To and atmospheric humidity Ho, and the data associated with both the indoor and outdoor environments such as the heating load data (D).

The frost amount calculating means 20 calculates an amount F(ti) of frost on the outdoor heat exchangers 7 and 8 on the condition that the inverter 1 runs for the time period ti at the frequency f(i), in accordance with the outdoor environmental condition data.

The first frequency selecting means 22 is constructed of a judgment means 22a, a continuous heating available frequency selecting means 22b, and a shortest time frequency selecting means 22c. The judgment means 22a conducts a judgment as to whether the frost amount F(ti) calculated by the calculating means 20 is greater than a predetermined allowable value $F_{lim}$. The continuous heating available frequency selecting means 22b selects a frequency f(i) at which a heating operation can be continuously carried out without a defrosting operation, in accordance with a corresponding judgment signal from the judgment means 22a. The selected frequency signal is sent to the shortest time frequency selecting means 22c. If there is no continuous heating available frequency, an NG signal is sent to the frequency setting means 18 (at the middle right in FIG. 3). Both the frequency setting means 18 shown at the upper left and middle right in FIG. 3 are the same component in practice. However, the operations are time sequentially carried out between both the means 18, and are therefore shown separately in FIG. 3 from the viewpoint of operation functions.

The shortest time frequency selecting means 22c selects one of the frequencies f(i) selected by the frequency selecting means 22b, the selected one providing a shortest time for changing the room temperature Ta to a preset temperature Ts. This frequency is sent as an optimum frequency fg1 to the inverter controlling means 16.

When an NG signal is inputted to the frequency setting means (at the middle right in FIG. 3), the second time calculating means 23 calculates for each frequency f(i), a time period tw(i) required for the frost amount F(ti) to reach the allowable value $F_{lim}$).

The room temperature calculating means 24 calculates for each frequency f(i), a room temperature Tv(i) to be obtained when the air conditioner runs for the time period tw(i).

The second frequency selecting means 25 selects a frequency f(i) corresponding to one of room temperatures Tv(i) nearest to the preset temperature Ts, and sends it as an optimum frequency fg2 to the inverter controlling means 16.

Figure 4A:
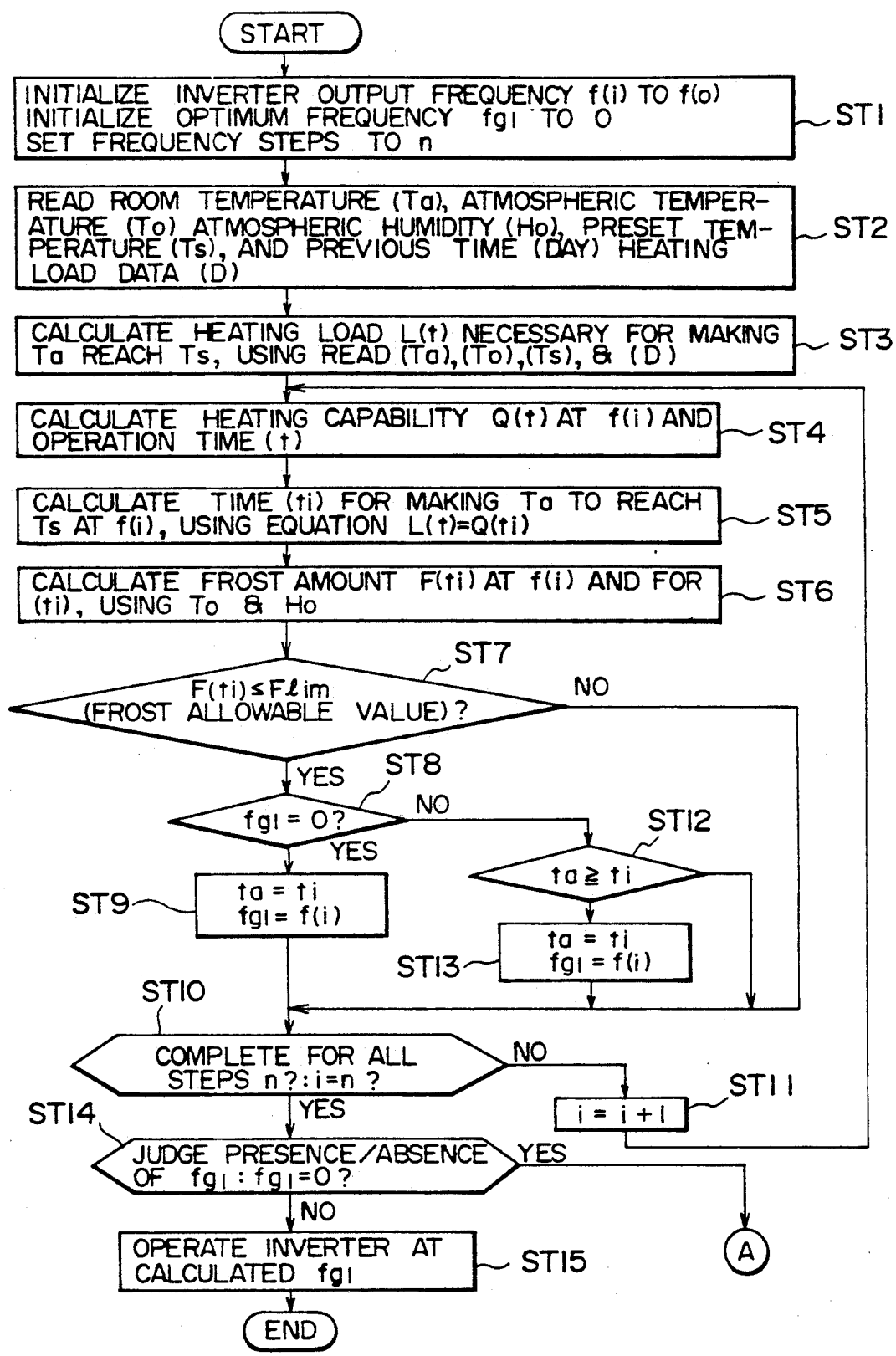
FIG. 4A is a flow chart illustrating the operation of the embodiment of the present invention.
Figure 4B:
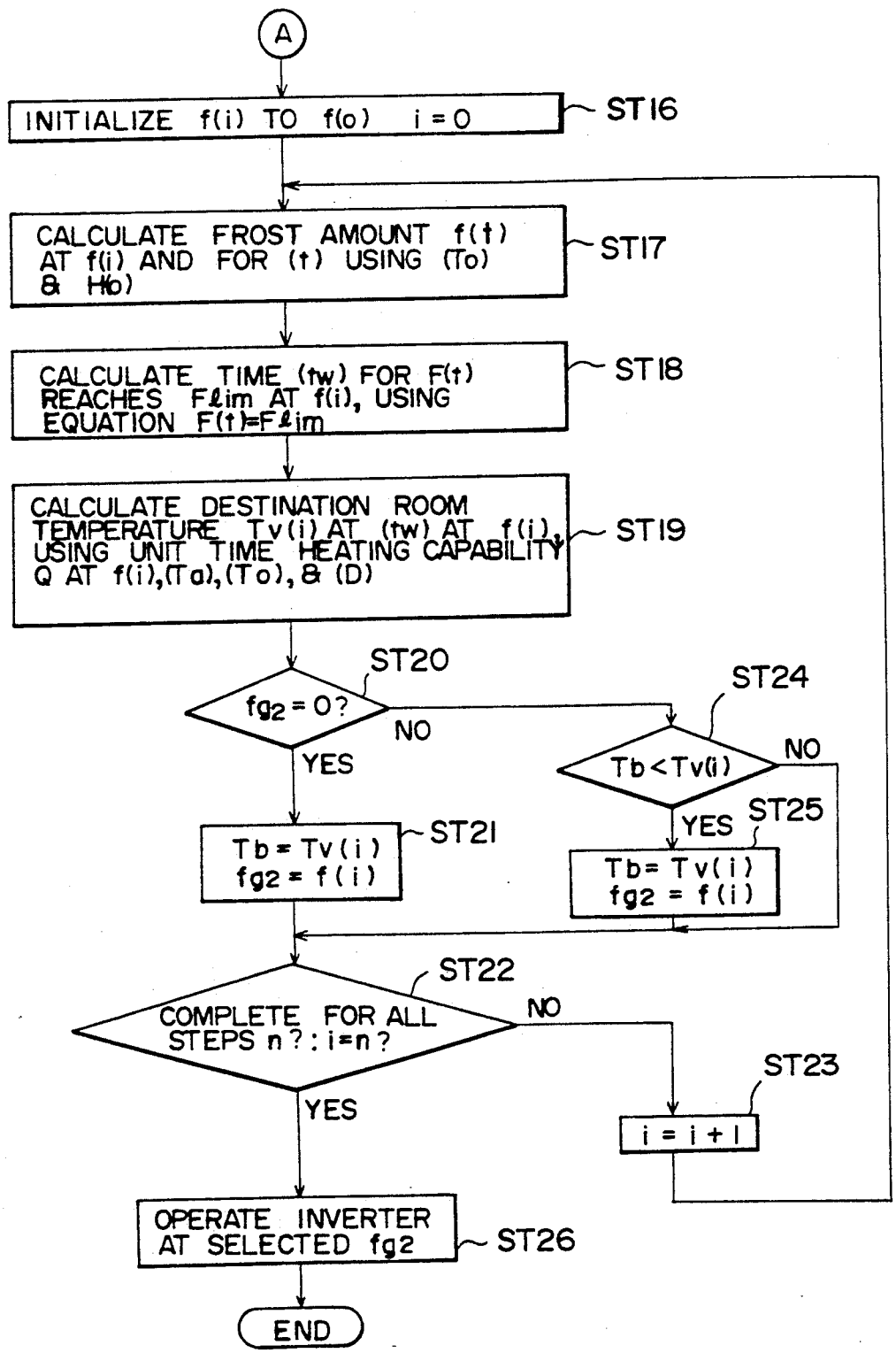
FIG. 4B is a flow chart illustrating the operation of another embodiment of the present invention.

Next, the operation of the frequency determining circuit 17 will be described with reference to the flow charts shown in FIGS. 4A and 4B. The flow chart of FIG. 4A is for the case wherein a defrosting operation is not needed until the room temperature reaches a preset temperature after the start of a heating operation, and the flow chart of FIG. 4B is for the case wherein a defrosting operation is needed. In normal heating operation without defrosting operation, the valves 11 and 12 are open and the valves 13 and 14 are in an ON state (to be described later).

First, at step ST1, the number of frequency steps is set to the output frequency f(i) is initialized to f(i)=f(o), and the optimum frequency fg1 is set to fg1 =0.

A symbol i represents the number of each frequency step, wherein i=0, 1, 2,..., n. A function f(i) represents an output frequency value at each step. A symbol fg1 represents an optimum frequency among n output frequencies, or represents a presence or absence of an optimum frequency.

At step ST2, the environmental condition data is read, the condition data including a room temperature Ta, atmospheric temperature To, atmospheric humidity Ho, and heating load data D at the previous time (day) operation.

At step ST3, a heating load L(t) is calculated in accordance with the environmental condition data, the heating load indicating a heating capacity (Kcal/h) necessary for making the room temperature Ta reach a preset temperature Ts. Specifically, the heating load L(t) as a function of time is calculated based on the previous time (day) heating load data (D), present actual room temperature Ta, preset temperature Ts, and atmospheric temperature To. The calculation result is shown as a heating load curve $S_1$ in FIG. 5.

Figure 5:
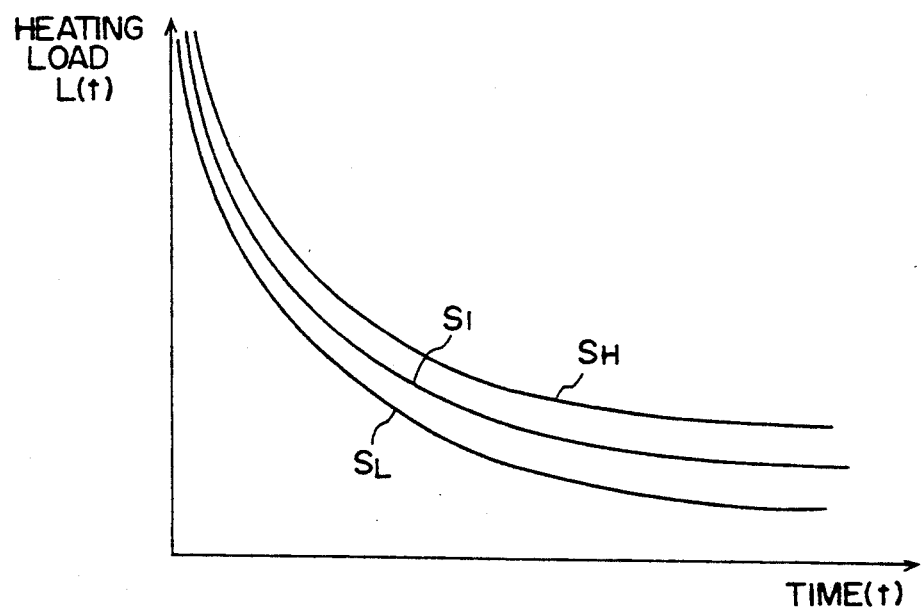
FIGS. 5 and 6 are graphs showing characteristic curves describing the contents of the flow chart of FIG. 4A.

In this case, if the, present atmospheric temperature To is higher than that of the day before and a difference (Ts −Ta) between the preset temperature and room temperature is the same, then a heating load curve having a lower value than that of the day before is calculated as shown at $S_L$ in FIG. 5. On the contrary, if the present atmospheric temperature To is the same as that of the day before and a difference (Ts−Ta) between the preset temperature and room temperature is greater than that of the day before, then a heating load curve having a higher value than that in yesterday is calculated as shown at $S_H$ in FIG. 5. In other words, the higher the atmospheric temperature, the lower value the heating load curve has, and the larger the difference (Ts−Ta) between a preset temperature and room temperature, the lower value the heating load curve has.

The curves $S_1$, $S_L$, and $S_H$ shown in FIG. 5 were obtained through calculation of actual data such as Ta, Ts, To, and the like. A plurality of heating load curves may be stored in advance in a memory to selectively use a suitable one.

Figure 6:
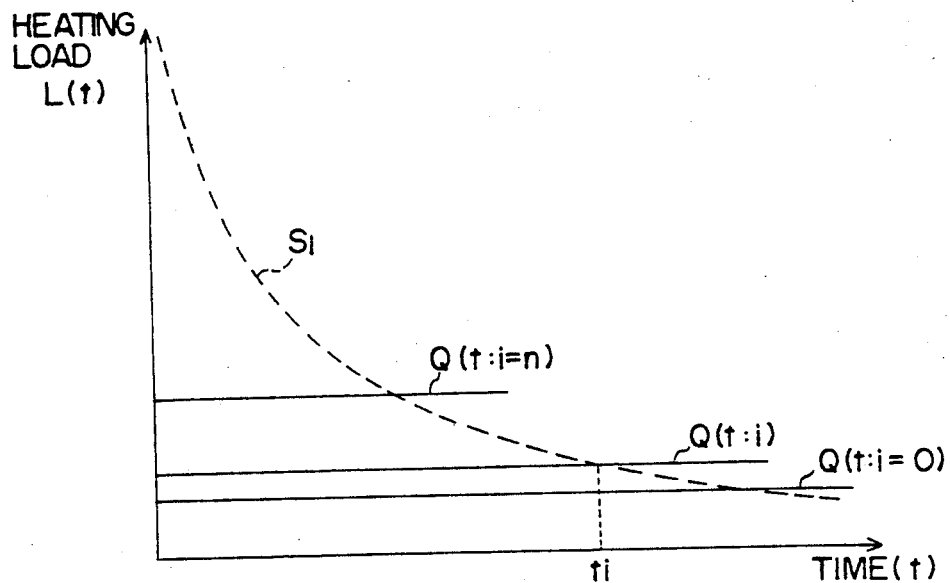

Next, at step ST4, a heating capacity Q(t:i) (Kcal/h) relative to an operation time period t of the inverter 1 running at a frequency f(i) is calculated as a straight line Q(t:i) as shown in FIG. 6. This heating capacity Q depends on the atmospheric temperature, room temperature, and the frequency at which the inverter 1 runs. If these parameters do not change, the heating capacity is substantially constant. However, the heating capacity gradually lowers as frost is deposited on the outdoor heat exchanger. At step ST5, a time period ti corresponding to an intersection between the straight line Q(t:i) and the present heating load curve, e.g., $S_1$ is obtained. This time period ti corresponds to a time period required for the room temperature Ta to reach a preset temperature Ts while the inverter 1 runs at the frequency f(i).

Figure 7:
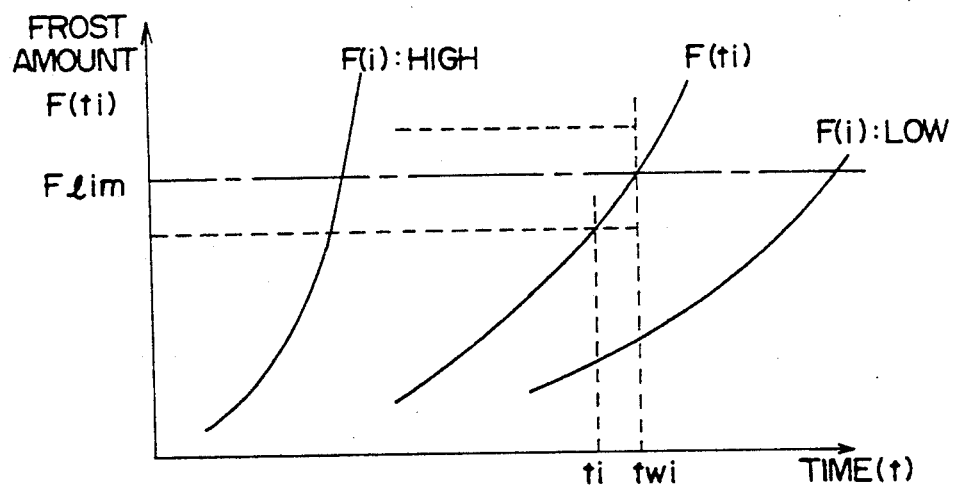
FIG. 7 is a graph showing characteristic curves describing the contents of the flow chart of FIG. 4B.

At step ST6, a frost amount F(ti) to be deposited on the outdoor heat exchangers 7 and 8 under the condition that the inverter 1 runs for the time period ti at the frequency f(i), is calculated in accordance with the atmospheric temperature To, atmospheric humidity Ho, and the like. As shown in FIG. 7, the frost amount F(ti) changes more rapidly the higher the frequency f(i) is. If the atmospheric temperature To is about 5° C. or higher, the temperature of the outdoor heat exchanger will not fall to 0° C. or lower. Therefore, the frost amount is nearly zero. If the atmospheric temperature To is about 5° C., the frost amount becomes maximum. As the atmospheric temperature lowers further, the frost amount reduces. If the atmospheric temperature is about −8° C. or lower, frost will be hardly deposited. As for the atmospheric humidity Ho, the higher the humidity, the greater the frost amount.

At step ST7, the frost amount F(ti) calculated at step ST6 is compared with a predetermined allowable frost amount $F_{lim}$. The level of this allowable frost amount $F_{lim}$ is determined such that if the frost amount F(ti) exceeds the allowable frost amount $F_{lim}$, it becomes necessary to perform the defrosting Operation for the outdoor heat exchangers 7 and 8. If it is judged at step ST7 that F(ti) is equal to or lower than $F_{lim}$, then the control advances to step ST8, whereas if it exceeds $F_{lim}$, the control advances to step ST10.

It is checked at step ST8 if the optimum frequency fg1 has been already set or not. The optimum frequency fg1 is the frequency at which the inverter 1 can operate without the defrosting operation until the room temperature reaches a preset temperature. At this step ST8, it is checked if there is already the optimum frequency fg1 for making the room temperature Ta reach a preset temperature Ts without the defrosting operation. If the optimum frequency is 0, it means that there has not been set the optimum frequency for making the room temperature reach a preset temperature without the defrosting operation. On the other hand, if fg1 is f(i) (i=0 to n), then it means that there has been set the optimum frequency for making the room temperature reach a preset temperature without the defrosting operation.

If fg1=0, the control advances to the next step ST9. If fg1 is not 0 but f(i), the control advances to step ST12. For example, if i=0 at step ST7, then it is apparent that fg1=0, so the control advances to step ST9.

At step ST9, the initial values of the shortest operation time period ta and optimum frequency fg1 are set, respectively for the case the inverter runs at the optimum frequency fg1 for making the room temperature Ta reach the preset temperature Ts without the defrosting operation. For example, if i=0 at step ST9, then the time period ta is set to a time period t0, and the frequency fg1 is set to f(i=0).

At step ST10, it is checked if the steps from ST4 to ST9 or to ST13 have been completed for all n frequency steps. In this case, i=0, so i is incremented to i+1 at step ST11, and thereafter the control returns to step ST4.

If fg1 is not 0 at step ST8, i.e, if the initial value of the optimum frequency fg1 has already been set, the control goes to step ST12. At step ST12, the stored operation time period ta (the initial value of the shortest operation time period) is compared with the operation time ti at the new frequency f(i) for making the room temperature reach the setting temperature. If the operation time period ti at the new frequency f(i) is longer than the time period ta, the frequency fg1 and time period ta are maintained unchanged. On the contrary, if the operation time period ti at the new frequency f(i) is ta or shorter, then the new frequency f(i) is set as fg1 and the operation time period ti is set to the time period ta.

In summary, the flow including steps ST8, ST9, ST12, and ST13, selects one of the frequencies allowing to make the room temperature reach the preset temperature without the defrosting operation, the selected frequency providing the shortest operation time period until the room temperature reaches the preset temperature. In this flow, there are eventually stored the selected frequency fg1 allowing to make the room temperature reach the present temperature without defrosting operation, and the shortest operation time period ta until the room temperature reaches the preset temperature.

After executing the above-described steps for all frequency steps $i = 0, 1, 2, \ldots, n$, it is checked at step ST14 if there is the optimum frequency fg1. If not fg1=0, then at step ST15 the frequency signal representative of fg1 is sent to the inverter controlling means 16. The inverter controlling means 16 drives the inverter 1 at the selected optimum frequency fg1 among f(i=0), f(i=1), ..., f(i=n).

As described above, if the inverter is driven at the optimum frequency fg1 selected by the above-described steps of FIG. 4A, the time period while the room temperature Ta reaches the preset temperature Ts can be made shortest without performing the defrosting operation after the start of the heating operation and until the room temperature Ta reaches the preset temperature Ts. Accordingly, in heating a cooled room, the room temperature can be rapidly raised to the preset temperature, providing comfortable heating.

There may occur at step ST14 the case that fg1=0, i.e., no optimum frequency fg1 is set. In such a case, the judgment at step ST7 is "NO" for all the steps of $i = 0, 1, 2, \ldots, n$, so the defrosting operation should be performed sometime before the room temperature Ta reaches the preset temperature Ts.

In such a case, the heating operation is temporarily stopped or the heating capability is temporarily suppressed, in order to perform the defrosting operation. Even in such case, it is desirable that the room temperature Ta be made as near the preset temperature as possible immediately before defrosting operation starts. FIG. 4B is a flow chart illustrating such an operation.

Specifically, if it is judged as fg1=0 at step ST14 of FIG. 4A, the frequency step $i = n$ is reset to $i = 0$ at step ST16 so that the inverter output frequency is again initialized to f(i=0).

At step ST17, in accordance with the atmospheric temperature To and atmospheric humidity Ho and the calculation result obtained by the frost amount calculating means 20, there is calculated a frost amount F(t) relative to a time period t under the condition that the inverter runs at the frequency f(i). The characteristics of the frost amount F(t) are the same as shown in FIG. 7.

At step ST18, a time period twi required for the frost amount F(t) reaches the allowable value $F_{lim}$ is obtained as an intersection between the curve F(t) and $F_{lim}$ as shown in FIG. 7. At step ST19 there is calculated a destination room temperature Tv(i) under the heating operation at the frequency f(i) for a time period tw1, in accordance with the previously read room temperature Ta, atmospheric temperature To, previous time (day) heating load data D, and heating capacity Q(t:i).

At step ST20 it is checked if an optimum frequency fg2 has already been set. Unlike the optimum frequency fg1, the optimum frequency fg2 is a frequency at which the room temperature becomes nearest the preset temperature immediately before the defrosting operation starts, i.e., at which the room temperature becomes highest at the time when the defrosting operation starts. At the stage of $i=0$, the optimum frequency fg2 is not still set. Therefore, at step ST21 Tv(i=0) is used as the highest destination room temperature Tb at the time when the defrosting operation starts, and f(i=0) is used as the optimum frequency fg2.

At step ST22, it is checked if the above-steps have been completed for all frequency steps n. Since at $i=0$ all the frequency steps are not still completed, i is incremented to $i=1$ at step 23 to thereafter repeat steps ST17 to ST19.

At step ST20 at $i=1$, fg2 is not 0. Accordingly, at step 24 the already set highest destination room temperature Tb(=Tv(i=0)) is compared with the room temperature Tv(i=1). If Tv(i=0)≧Tv(i=1), the previous Tv(i=0) and f(i=0) are used as Tb and fg2, respectively. On the other hand, if Tv(i=0)<Tv((i=1), the values Tb and fg2 are updated to Tv(i =1) and f(i=1) at step ST25.

The above-described steps for all frequency steps i $=0, 1, 2, \ldots, n$, are executed. Lastly, there is stored as fg2 the frequency at which the room temperature becomes highest when defrosting operation starts. At step ST26, the frequency signal representative of fg2 is sent to the inverter controlling means 16. The inverter controlling means 16 drives the inverter 1 at the selected optimum frequency fg2 among f(i=0), f(i=1), ..., f(i=n).

As described above, if the inverter is driven at the optimum frequency fg2 selected by the above-described steps of FIG. 4B and the defrosting operation is required to be performed after the start of the heating operation until the room temperature Ta reaches the preset temperature, the room temperature Ta can be made nearest the preset temperature when the defrosting operation starts. Accordingly, even when defrosting operation starts in a cold district after the start of the heating operation and before the preset temperature is obtained, the room temperature can be made nearest the preset temperature. As a result, it is possible to suppress the room temperature to be excessively lowered by defrosting operation, and to minimize uncomfortable feeling.

An inverter output frequency allowing the most comfortable feeling while the room temperature Ta reaches the preset temperature Ts after the heating operation can thus be determined by the operations shown in FIGS. 4A and 4B.

Even in the case where the defrosting operation is performed, it is desirable to not lower the heating capacity so as to realize more comfortable heating. In connection, with this the defrosting operation by the defrosting controller 15 without lowering the heating capacity as much as possible will be described with reference to the flow chart of FIG. 8.

Figure 8:
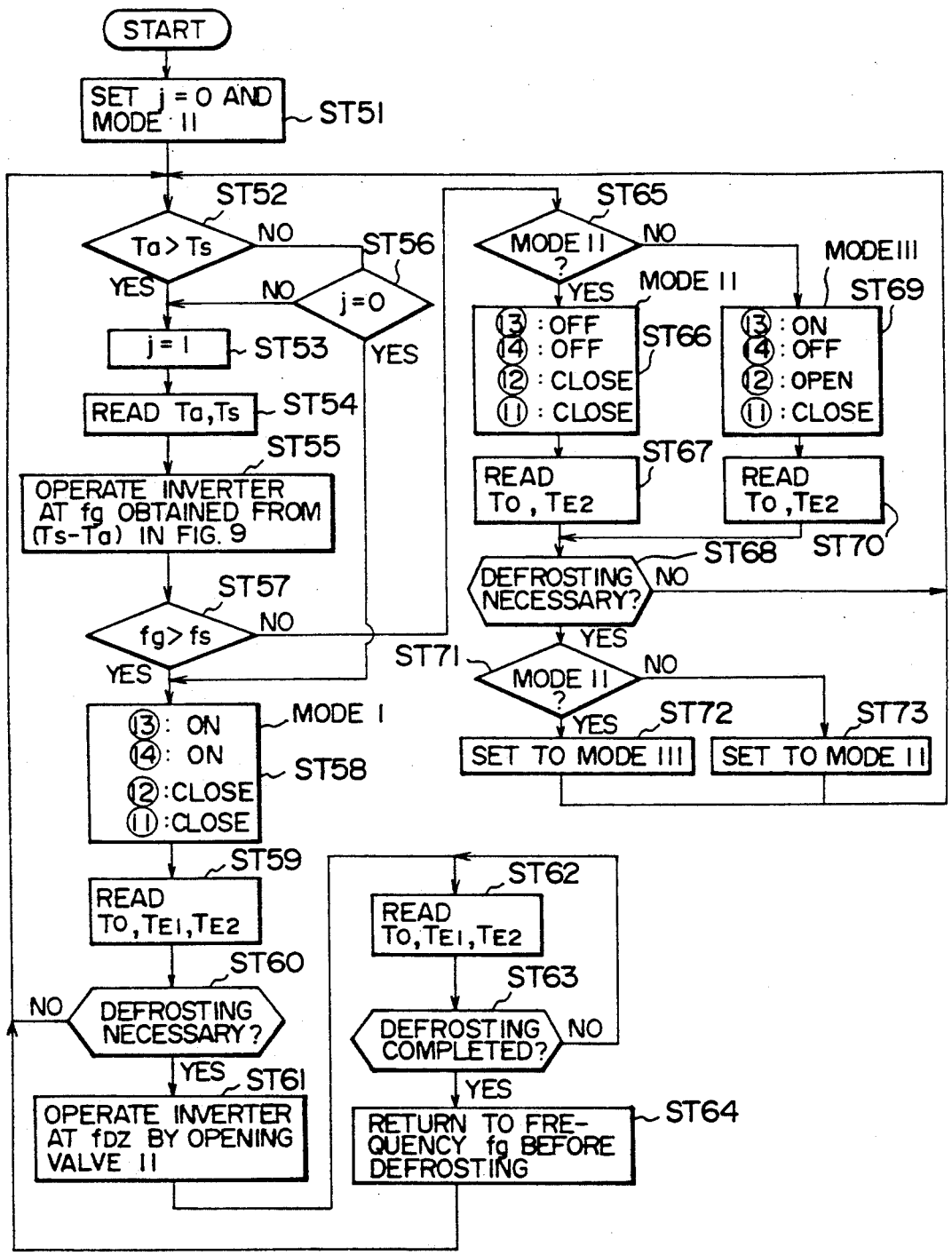
FIG. 8 is a flow chart illustrating the operation of a further embodiment of the present invention.

In FIG. 8, $j=1$, 0 represents a flag for discriminating if the operation starts after the room temperature Ta reaches the preset temperature Ts. $T_{E1}$ represents a temperature of the outdoor heat exchanger 7 (refer to FIG. 1), and $T_{E2}$ represents a temperature of the outdoor heat exchanger 8.

In a mode I, a defrosting operation is performed (by stopping the outdoor fan 10) by flowing high temperature refrigerant into both the outdoor heat exchangers 7 and 8. In mode I it is possible to defrost rapidly, so that mode I is suitable for the defrosting operation to be performed before the room temperature Ta reaches the preset temperature Ts.

In a mode II, low temperature refrigerant is prevented from flowing into the outdoor heat exchanger 7, and the heating operation is carried out only for the outdoor heat exchanger 9 (the outdoor fan 10 is therefore maintained rotated). In mode II, the defrosting operation is carried out for outdoor heat exchangers 7 while preventing low temperature refrigerant from flowing into the exchanger 7 and using air blown by the outdoor fan 10. Therefore, the defrosting capacity is weaker than mode I. However, heat exchange in the heating operation mode continues in the outdoor heat exchanger 8, so that the room temperature does not lower excessively. Mode II is therefore suitable for use in defrosting after the room temperature Ta has reached the preset temperature Ts. In mode III, the operations of the outdoor heat exchangers 7 and 8 are interchanged.

Referring to FIG. 8, it is assumed that a controlling means (not shown) of the defrosting controller 15 sets the flag j to j=0 and the defrosting mode to mode II, respectively at step ST51.

At step ST52, the room temperature Ta is compared with the preset temperature Ts. If Ta>Ts, the flag j is set to j=1 at step ST53.

Figure 9:
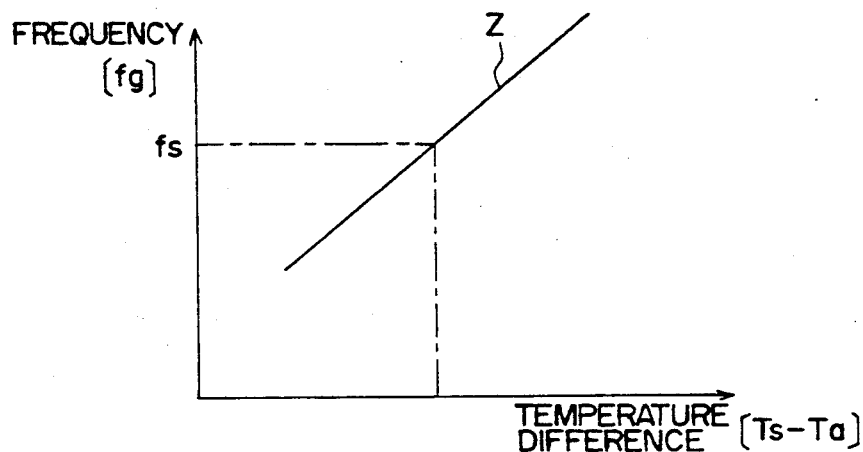
FIG. 9 is a graph showing characteristic curves describing the contents of the flow chart of FIG. 8.

At step ST54, the temperatures Ta and Ts are read to calculate a difference (Ts−Ta) therebetween. At step ST55, the characteristic curve Z of FIG. 9 showing the relation between the temperature difference (Ts−Ta) and optimum frequency fg is referred to, to obtain the optimum frequency fg corresponding to the difference (Ts −Ta). The frequency signal corresponding to the optimum frequency is sent to the inverter controlling means 16. It is to be noted that the flow is arranged such that if Ta≦Ts at step ST52, then it is checked at step ST56 if there was any operation time period under Ta>Ts. If affirmative, the flag is set to j=1 at step ST53. If negative (meaning that this operation time period is near the start of the heating operation), the control advances to step ST58.

At step ST57, the optimum frequency fg obtained at step ST55 is compared with a predetermined reference frequency fs. The reason for executing this comparison is as follows. If fg>fs, (Ts−Ta) is relatively large so that it is necessary to perform the defrosting operation (mode I) rapidly. On the contrary, if fg≦fs, (Ts−Ta) is relatively small so that it is preferable to perform defrosting operation (mode II or III) gently.

If fg>fs at step ST57, the defrosting controller 15 controls at step ST58 the two-port valves and three-port valves to execute mode I (correctly, mode I is the state when the two-port valve 11 is made open at step ST58). Specifically, the three-port valves 13 and 14 shown in FIG. 1 are made in an ON state, and the two-port valves 11 and 12 are closed. The ON state of the three-port valve 13 herein means that a flow path is formed in the directions from a to b and vice versa, and the OFF state means that a flow path is formed in the directions form a to c and vice versa. Similarly, the ON state of the three-port valve 14 means herein that a flow path is formed in the directions from d to e and vice versa, and the OFF state means that a flow path is formed in the directions from e to f and vice versa.

Next, the atmospheric temperature To, outdoor heat exchanger temperatures $T_{e1}$ and $T_{E2}$ are read at step ST59 to judge at step ST60 if the defrosting operation is now necessary. If not, the control returns to step ST52. If necessary, at step ST61 the two-port valve 11 is made in an OPEN state and the inverter 1 is driven at the frequency $f_{DZ}$. This frequency $f_{DZ}$ is a predetermined inverter output frequency for the defrosting operation in Mode I.

As the two-port valve 11 is opened, high temperature refrigerant ejected out of the compressor 32 is supplied directly to the outdoor heat exchangers 7 and 8 so that the defrosting operation for the exchangers 7 and 8 are performed rapidly. As shown in FIG. 1, the high temperature refrigerant from the compressor 3 can flow into the indoor heat exchanger 5 via the four-port valve 4. However, the amount of refrigerant flowing toward the indoor heat exchanger 5 is small because of a presence of the capillary 6 (decompressor), and most of the high temperature refrigerant flows toward the outdoor heat exchangers 7 and 8.

After the defrosting operation continues for a predetermined time period in mode I, the atmospheric temperature To and outdoor heat exchanger temperatures $T_{E1}$ and $T_{E2}$ are read at step ST62 to judge if defrosting has been completed or not. If defrosting has been completed, a defrosting completion signal is sent to the inverter controlling means 16 at step ST64 to drive the inverter at the frequency fg before defrosting operation. Control then returns to step ST57.

If fg≦fs at step ST57, it is judged at step 65 if set mode is mode II. If mode II, in order to continue the defrosting operation for the outdoor heat exchanger 7 in mode II, the three-port valves 13 and 14 are made in the OFF state and the two-port valves 11 and 12 are closed. After defrosting operation in mode II is executed for a predetermined time period, the atmospheric temperature To and temperature $T_{E2}$ of the outdoor heat exchanger 8 are read at step ST67 to judge at step ST68 if it has become necessary to defrost also the outdoor heat exchanger 8. Similarly, if mode is judged at step ST65, the defrosting operation for the outdoor heat exchanger 8 continues in mode III. After a predetermined time lapse, the temperatures To and $T_{E1}$ are read at step ST70 to judge at step ST68 if it has become necessary to defrost also the outdoor heat exchanger 7.

As shown at steps ST67 and 70, the temperatures $T_{E1}$ and $T_{E2}$ are for the heat exchangers (into which low temperature refrigerant flows) performing heat exchange for the heating operation, and not for the heat exchangers (to which low temperature refrigerant is not supplied) performing the defrosting. The reason for this is that the temperature of a heat exchanger subject to defrosting is not necessary to be read. In order to control more precisely, the temperature of the heat exchanger subject to the defrosting may also be read.

If defrosting for the outdoor heat exchanger 8 is judged as necessary at step ST68 after steps ST66 and ST67, then the previous defrosting mode is again checked at step ST71. In this example, defrosting mode II has been performed, and so defrosting mode III is set at step ST72. Namely, since it was judged at step ST68 that the frost amount at the outdoor heat exchanger 8 is increasing, the heating operation by the outdoor heat exchanger 8 is temporarily stopped. Instead, the heating operation by the outdoor heat exchanger 7 is carried out and defrosting operation for the outdoor heat exchanger 8 is carried out. Similarly, if it is judged at step ST71 that the defrosting mode III has been performed, the defrosting mode II is then carried out at step ST73.

With the defrosting operation as illustrated in FIG. 8, the defrosting operation carried out before the room temperature Ta reaches the present temperature Ts can be completed in a short time. Furthermore, if defrosting operation is to be carried out after the room temperature Ta reaches the preset temperature Ts, it is possible to continue heating operation by one of the outdoor heat exchangers while performing the defrosting operation by the other outdoor heat exchanger.

Figure 10:
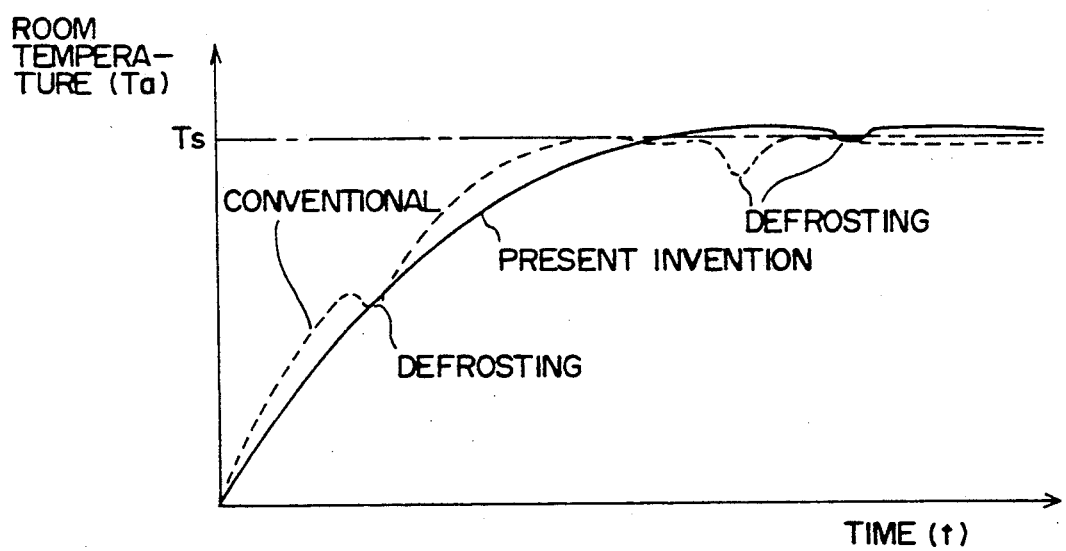
FIG. 10 is a graph showing the room temperature characteristic curves comparing a conventional technique and the present invention.

FIG. 10 shows an example of a comparison of the room temperature characteristics after the start of the heating operation, between an air conditioner by a conventional control (broken line) and an air conditioner by the control (solid line) of the present invention. As seen from FIG. 10, the conventional control has a phenomenon that the room temperature abruptly and temporarily lowers due to defrosting operation before the room temperature reaches the preset temperature Ts. However, according to the present embodiment, the inverter is driven at the frequency as described in the flow chart shown in FIG. 4A, preventing the phenomenon of abruptly lowering the room temperature until it reaches the preset temperature.

In the above embodiments, two outdoor heat exchangers 7 and 8 are provided. The number of outdoor heat exchangers may be increased. The present invention is accordingly applicable not only to household air conditioners but also to business or factory air conditioners.

What is claimed is:

1. A defrosting control method for an air conditioner having a refrigerating cycle including in succession a compressor, and indoor heat exchanger, a decompressor, and an outdoor heat exchanger, said compressor being variable-speed driven by an inverter via a compressor motor, and when the frost amount of said outdoor heat exchanger becomes an allowable value or more during a heating operation, a defrosting operation is performed for defrosting the outdoor heat exchanger, said defrosting control method comprising:
    a first step of setting a plurality of frequencies which said inverter can output;
    a second step of calculating a time period required for a room temperature to reach a preset temperature after the start of the heating operation by said inverter running at one of said plurality of frequencies, in accordance with an environmental condition data;
    a third step of calculating the frost amount of said outdoor heat exchanger in accordance with said environmental condition data, under the condition that said inverter runs for said time period calculated at the second step;
    a fourth step of selecting an inverter output frequency from said plurality of frequencies set at the first step, said inverter output frequency allowing each of said frost amounts calculated at the third step to take said allowable value or less, said allowable value being determined as a level indicating the defrosting operation is unnecessary; and
    a fifth step of controlling said inverter so as to have said output frequency selected at the fourth step.

2. A defrosting control method according to claim 1, wherein said second step includes:
    a step of calculating a heating load necessary for making said room temperature reach said preset temperature, in accordance with said environmental condition data;
    a step of calculating a heating capacity under the condition that said inverter runs at the frequency set at said first step; and
    a step of calculating said time period for making said room temperature reach said preset temperature under the condition that said inverter runs at the frequency and said calculated heating load and heating capacity.

3. A defrosting control method according to claim 1, wherein said fourth step includes a step of selecting one of said inverter output frequencies allowing each said frost amount to take said allowable value or less, said selected inverter output frequency making said time period shortest.

4. A defrosting control method according to claim 1, further comprising:
    a sixth step of calculating a time period allowing each said frost amount to take said allowable value, if there is no frost amount calculated at said third step which amount takes said allowable value or less;
    a seventh step of calculating each said room temperature to be obtained when said inverter runs for said time period calculated at said sixth step, in accordance with said environmental condition data; and
    an eighth step of selecting one of said inverter output frequencies corresponding to one of said room temperatures calculated at said seventh step, said room temperature being nearest to said preset temperature,
    wherein in the case where it is necessary to perform said defrosting operation before said room temperature reaches said preset temperature at any one of said frequencies set at said first step, said inverter is controlled to run and have said output frequency selected by said eighth step until said defrosting operation is carried out.

5. A defrosting control method according to claim 1, wherein in calculating said time period at said second step, there are used, as said environmental condition data, physical quantities required for obtaining said heating load, and/or a heating load at a previous operation time.

6. A defrosting control apparatus for an air conditioner having a refrigerating cycle including in succession a compressor, an indoor heat exchanger, a decompressor, and an outdoor heat exchanger, said compressor being variable-speed driven by an inverter via a compressor motor, and when the frost amount of said outdoor heat exchanger becomes an allowable value or more during a heating operation, a defrosting operation is performed for defrosting the outdoor heat exchanger, said defrosting control apparatus comprising:
    frequency setting means for setting a plurality of frequencies which said inverter can outputs;
    first time period calculating means for calculating a time period required for a room temperature to reach a preset temperature after the start of the heating operation by said inverter running at one of said plurality of frequencies set by said frequency setting means, in accordance with an environmental condition data;

frost amount calculating means for calculating the frost amount of said outdoor heat exchanger in accordance with said environmental condition data, under the condition that said inverter runs for said time period calculated by said first time period calculating means;

first frequency selecting means for selecting an inverter output frequency from said plurality of frequencies set by said frequency setting means, said inverter output frequency allowing each of said frost amounts calculated by said frost amount calculating means to take said allowable value or less, said allowable value being determined as a level indicating the defrosting operation is unnecessary; and inverter controlling means for controlling said inverter so as to have said output frequency selected by said first frequency selecting means.

7. A defrosting control apparatus according to claim 6, wherein said first time period calculating means includes:

means for calculating a heating load necessary for making said room temperature reach said preset temperature, in accordance with said environmental condition data;

means for calculating a heating capacity under the condition that said inverter runs at the frequency set by said frequency setting means; and means for calculating said time period for making said room temperature reach said preset temperature under the condition that said inverter runs at the frequency and said calculated heating load and heating capacity.

8. A defrosting control apparatus according to claim 6, wherein said first frequency selecting means includes means for selecting one of said inverter output frequencies allowing each said frost amount to take said allowable value or less, said selected inverter output frequency making said time period shortest.

9. A defrosting control apparatus according to claim 6, further comprising:

second time period calculating means for calculating a time period allowing each said frost amount to take said allowable value, if there is no frost amount calculated by said frost amount calculating means which amount takes said allowable value or less;

room temperature calculating means for calculating each said room temperature to be obtained when said inverter runs for said time period calculated by said second time period calculating means, in accordance with said environmental condition data; and second frequency selecting means for selecting one of said inverter output frequencies corresponding to one of said room temperatures calculated by said room temperature calculating means, said room temperature being nearest to said preset temperature, wherein in the case where it is necessary to perform said defrosting operation before said room temperature reaches said preset temperature at any one of said frequencies set by said frequency setting means, said inverter is controlled to run and have said output frequency selected by said second frequency selecting means until said defrosting operation is carried out.

10. A defrosting control apparatus according to claim 6, wherein in calculating said time period by said first time period calculating means, there are used, as said environmental condition data, physical quantities required for obtaining said heating load, and/or a heating load at a previous operation time.

* * * * *